United States Patent [19]

Nakázawa et al.

[11] Patent Number: 5,720,439
[45] Date of Patent: Feb. 24, 1998

[54] HIGH SPEED AGITATED GRANULATION METHOD AND HIGH SPEED AGITATED GRANULATING MACHINE

[75] Inventors: Shinzo Nakázawa, Tokyo; Shoichi Moro, Tochigi, both of Japan

[73] Assignee: Tokyo Tanabe Company Limited, Tokyo, Japan

[21] Appl. No.: 646,250

[22] PCT Filed: Nov. 11, 1994

[86] PCT No.: PCT/JP94/01919

§ 371 Date: May 8, 1996

§ 102(e) Date: May 8, 1996

[87] PCT Pub. No.: WO95/13131

PCT Pub. Date: May 18, 1995

[30] Foreign Application Priority Data

Nov. 12, 1993 [JP] Japan .................................. 5-283124

[51] Int. Cl.⁶ ......................................................... B02C 19/00
[52] U.S. Cl. ........................... 241/21; 241/22; 241/23; 241/33; 241/46.17; 241/65
[58] Field of Search ............................. 241/21, 22, 23, 241/46.17, 65, 282.1, 33

[56] References Cited

U.S. PATENT DOCUMENTS

| | | | |
|---|---|---|---|
| 4,511,093 | 4/1985 | Ohkoshi et al. | 241/60 |
| 4,556,175 | 12/1985 | Motoyama et al. | 241/57 |
| 4,623,098 | 11/1986 | Motoyama et al. | 241/46.04 |
| 4,789,105 | 12/1988 | Hosokawa et al. | 241/67 |
| 4,848,673 | 7/1989 | Masuda et al. | 241/5 |

FOREIGN PATENT DOCUMENTS

| | | |
|---|---|---|
| 63042730 | 2/1988 | European Pat. Off. . |
| 02160032 | 6/1990 | European Pat. Off. . |
| 0 388 705 | 9/1990 | European Pat. Off. . |
| 0 530 903 A1 | 3/1993 | European Pat. Off. . |
| 61-78430 | 4/1986 | Japan . |

OTHER PUBLICATIONS

Ohm K.K. Mar. 10, 1991 Japan Powder Industry Technology Association *Granulation Handbook*.

*Primary Examiner*—John M. Husar
*Attorney, Agent, or Firm*—McGlew and Tuttle

[57] ABSTRACT

A method for the production of granules by the use of a high speed agitated granulating machine provided with agitating means for rolling and agitating a substance for granulation, spray means for spraying a binding liquid on the substance, disintegrating means for disintegrating particles arising from granulation, and drying means for drying the particles, characterized by effecting the production by causing the means to act on the substance for granulation simultaneously thereby performing the agitating, granulating, disintegrating, and drying operations simultaneously. An apparatus for automatically implementing the method is also disclosed. The method for high speed agitating sterilization according to this invention is capable of producing granules which are extremely homogeneous in contents of components and excellent in flowability and compression moldability. The granules in process of formation do not easily form coarse lumps as by cohesion and the produced granules possess stable quality. The tablets which are produced with the granules obtained by the method of this invention are extremely homogeneous in terms of contents of active components, color tone, etc. and enjoy excellent mechanical strength.

4 Claims, 6 Drawing Sheets

HIGH SPEED AGITATED GRANULATION METHOD AND HIGH SPEED AGITATED GRANULATING MACHINE

TECHNICAL FIELD

This invention relates to a method for the production of granules in the field of medicines or foodstuffs and an apparatus therefor. More particularly, this invention relates to a method for obtaining granules containing components thereof in a highly homogeneous state by using a high speed agitated granulating machine and effecting the agitating, granulating, disintegrating, and drying operations simultaneously and an apparatus to be used therefor.

BACKGROUND ART

One of the methods available for wet production of granules is the method of high speed agitated granulation using a high speed agitated granulating machine. The "high speed agitated granulating machine" is a granulating device which is provided in the agitating vessel thereof with agitating blades for imparting a rolling and agitating action on a substance subjected to granulation and also with disintegrating blades for imparting a disintegrating action thereon. It is capable of obtaining heavy spherical particles by causing the substance subjected to granulation to be spirally circulated by means of the agitating blades, adding a binding liquid to the spiral stream of the substance and meanwhile granulating the resultant mixture and, at the same time, imparting powerful shearing force locally to the mass of granules in motion thereby disintegrating it.

By this granulating method, however, the homogeneity which the composition of components assumes during the course of mixing cannot be easily kept intact thence because the binding liquid is instantaneously added dropwise to the circulating stream of the substance for granulation and the substance in a consequent wetted state is pelletized and, as a result, the components of the substance are liable to succumb to migration. Specifically when the binding liquid is added dropwise to the substance, those of the particles which are amply coated with the binding liquid during the course of granulation form coarse lumps and those which are not amply coated therewith form fine particulates. In the case of finely divided active components which are not easily wetted with the binding liquid, once they are wetted, they are particularly liable to adhere to and aggregate on the coarse lumps and, as a result, induce the phenomenon of segregation of the components in the formed granules. Further, the fact that the substance is subjected to the granulation in its wetted state entails the disadvantage that this substance is liable to adhere to and aggregate on the inner wall of the agitating vessel or on the agitating blades to the extent of rendering production of uniform granules difficult.

The high speed agitated granulating machine mentioned above is known to embrace a version which is provided with a jacket. This jacket, however, has been solely utilized for thermally drying the granules still in process of formation subsequently to the granulating operation, cooling the substance of highly adhesive or thermally unstable quality during the course of granulation, or thermally fusing the binder which is made of a low melting material and put to use in a powdery form. A method which uses the jacket as a means for drying the substance undergoing the process of granulation and performs the agitating, granulating, drying, and disintegrating operations simultaneously and continuously has not been adopted to date. Nor has there existed any high speed agitated granulating machine which is provided with an electric control circuit for automatically performing these operations.

The other methods which are available for wet production of granules include a method of kneading granulation which resorts to a compaction type kneading device or a rolling and agitating kneading device and, when necessary, effects granulation by the use of an extruding pelletizer or a crushing pelletizer, a method of fluidized-bed granulation which aggregates and pelletizes a given substance as dispersed in the form of a fluidized bed, and a method of complex granulation which combines the method of fluidized-bed granulation as a basis with the method of agitating or rolling granulation. The method of kneading granulation, however, entrains the migration of components of the substance during the course of granulation for the same reason as adduced above for the method of high speed agitated granulation. The method of fluidized-bed granulation and the method of complex granulation, despite the advantage that the granules are allowed to cohere and the migration of components in the granules occurs only sparingly because the granulating and drying operations are performed simultaneously, are at a disadvantage in producing no ample disintegrating action for separating the cohering granules because the substance is pelletized as held in a fluidized state in which the component particles of the substance are separated with large gaps. For these reasons, the methods invariably fall short of being fully satisfactory in terms of the homogeneity of the components in the produced granules.

On account of these adverse factors, the granules obtained by any of the conventional methods of wet production are liable to have the components thereof dispersed with no sufficient homogeneity. Particularly in the case of a medicine, the fluctuation in the contents of the active components in the individual granules constitutes itself a very serious defect in the quality specified by the GMP (good manufacturing practice: the standard concerning the control of manufacture and quality of medicines). When colored tablets are produced with the granules obtained by any of the conventional methods, the segregation of a colored component from the granules induces the phenomenon of so-called uneven coloration and seriously impairs the marketability of the produced colored tablets.

The present invention has been produced in view of various problems of the prior art mentioned above. An object of this invention resides in producing granules which are free from the segregation of components thereof and, moreover, are excellent in flowability and compression moldability. Another object of this invention consists in producing tablets of high quality which are homogeneous in contents of active components and color tone and, moreover, excellent in mechanical strength.

DISCLOSURE OF THE INVENTION

The method for high speed agitated granulation according to this invention is a method for wet production of granules by the use of a high speed agitated granulating machine which is provided with agitating means for rolling and agitating a substance for granulation, spray means for spraying a binding liquid on the substance, disintegrating means for disintegrating particles arising from granulation, and drying means for drying these particles. This method is characterized by causing the means mentioned above to act simultaneously on the substance being pelletized and implementing the production while performing the agitating, granulating, disintegrating, and drying operations simultaneously.

The method for high speed agitated granulation according to this invention can utilize a high speed agitated granulating machine of the type which is used generally for such operations as mixing and granulating a powder. Specifically, the high speed agitated granulating machine to be used in this invention is generally provided with a cylindrical, conical, or spherical agitating vessel adapted to accommodate therein the substance subjected to granulation. As the agitating means, agitating blades or a disk disposed at the center of the inner bottom surface of the agitating vessel and adapted to be rotated about a vertical axis is used. As the spray means, a spray device which comprises a liquid storage tank disposed outside the agitating vessel, a liquid pump, a spray gun disposed inside the agitating vessel, and a liquid pipe serving to interconnect the component parts mentioned above is used. As the disintegrating means, disintegrating blades which are disposed inside the agitating vessel and rotated about a horizontal axis or suspended from the upper interior of the agitating vessel by a supporting arm, dipped in the mass of the substance subjected to granulation, and rotated therein are used. As concrete examples of the drying means, a jacket wrapped around the periphery of the agitating vessel and adapted either to allow circulation therethrough of such a heat medium as hot water or steam or to permit direct storage therein of a heat source, heat transfer devices such as the heat transfer plate suspended from the upper interior of the agitating vessel by a supporting arm and dipped directly in the mass of the substance for granulation, an air blower for partially aerating or wholly decompressing the interior of the agitating vessel for improving the efficiency of drying, decompressing devices, and microwave generators for drying by means of microwaves may be cited.

The method for high speed agitated granulation according to this invention implements the production of granules by causing the means mentioned above to operate simultaneously and enabling the granulating operation by the spray means, the drying operation by the drying means, and the disintegrating operation by the disintegrating means to be simultaneously carried out on the substance in the process of being rolled and stirred by the agitating means. It should be noted, however, that all the means mentioned above are not required to be operated continuously throughout the whole process of production. For example, the spray means or the drying means may be intermittently operated when the water content of the substance for granulation must be regulated at a constant level during the whole course of granulation. Thus, part or all of the means may be operated intermittently or discontinuously, depending on the state in which the granulation is proceeding at the relevant point of time. The method of this invention, therefore, may be employed only partly in the whole process of production.

The high speed agitated granulating machine of this invention is characterized by being furnished with automatic control means for simultaneously operating the means mentioned above and performing the agitating, granulating, drying, and disintegrating operations simultaneously. As concrete examples of the automatic control means, the relay type control devices using contactors for the control and the sequence type control devices using programmable controllers having no use for contactors for the control may be cited.

In the method of this invention for high speed agitated granulation, since the granulating and drying operations are simultaneously carried out, the granules in process of formation have a low water content, permit fast cohesion, and succumb to migration of components thereof only with difficulty as compared with the granules produced by the conventional method for high speed agitated granulation. Further, owing to the mechanism peculiar to the high speed agitated granulation which allows the granulation of a given substance to proceed while the granules in process of formation in the state of a fixed bed are exposed simultaneously to the action of agitating and the action of local disintegration and the same granules as separated with small gaps are allowed to repeat union and disunion amply, the method of this invention is capable of producing granules which enjoy the great weight and the very homogeneous dispersion of components that are never attained by the method of fluidized-bed granulation and the method of complex granulation. Further, since the actions mentioned above are exerted on the granules in process of formation which have a low water content and are bound with great fastness as compared with those involved in the conventional method for high speed agitated granulation, the method of this invention obtains granules which are formed of dense aggregates having as their units such minute particles as hardly retain the original shape of primary particles. Thus, the method of this invention realizes the very prominent moldability and flowability that have never been attained by the conventional high speed agitated granulation.

When tablets are produced with the granules obtained by this invention, therefore, they acquire prominent homogeneity in the contents of components and in the color tone because the granules do not induce any segregation of active components and coloring components. Further, since the granules excel in moldability and flowability, the tablets consequently produced therewith acquire outstanding mechanical strength and exhibit homogeneous physical properties.

Moreover, since the method of this invention for high speed agitated granulation allows the granulation to proceed while the granules in process of formation are in a state having a low water content as compared with the conventional method for high speed agitated granulation, it obtains granules of constant quality in a uniform shape without giving rise to coarse lumps which would originate in the adhesion of granules in process of formation as to the inner wall of the agitating vessel during the course of production.

BEST MODE FOR CARRYING OUT THE INVENTION

Example 1

Figure 1:
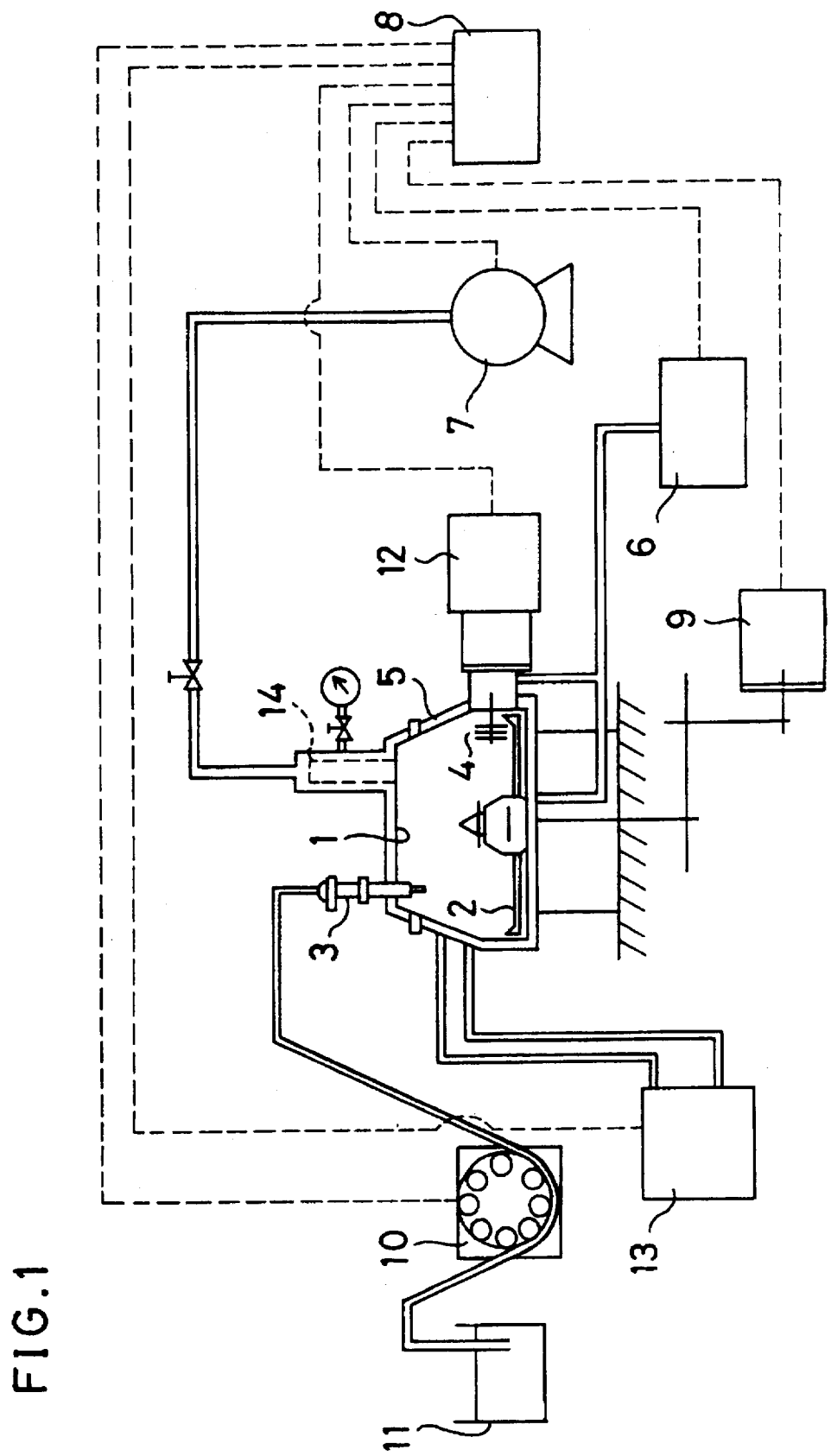
FIG. 1 is a conceptual diagram of one example of the high speed agitated granulating machine of this invention.
Figure 2:
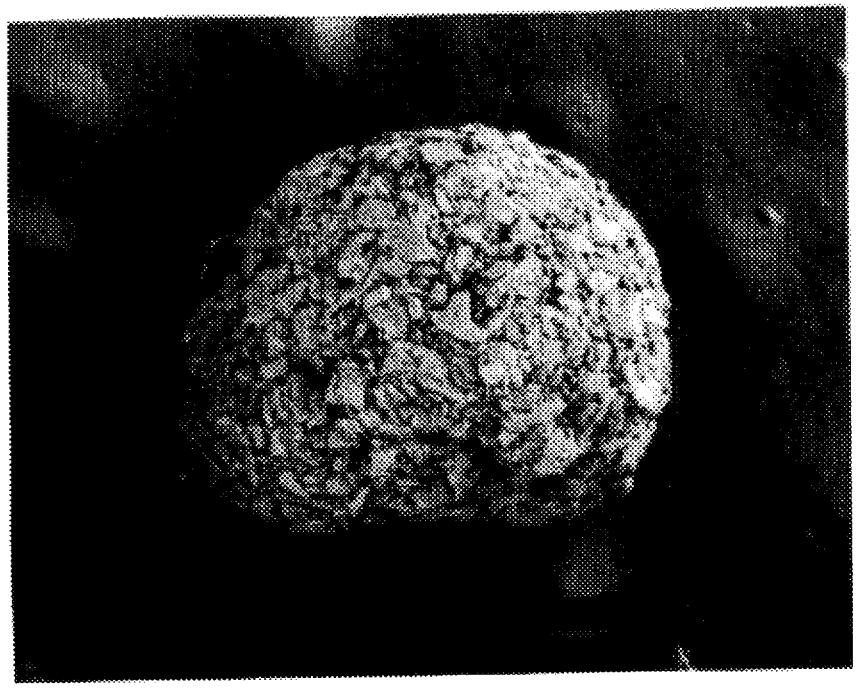
FIG. 2 is an electron micrograph (100 magnifications) of the surface of a pellet obtained by the conventional method of high speed agitated granulation.
Figure 3:
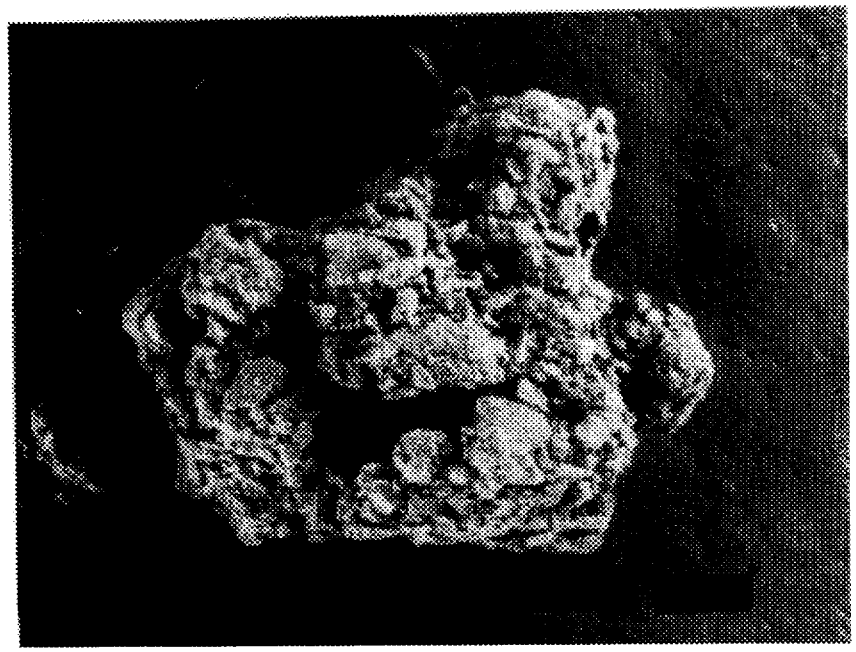
FIG. 3 is an electron micrograph (100 magnifications) of the surface of a pellet obtained by the conventional method of fluidized-bed granulation.
Figure 4:
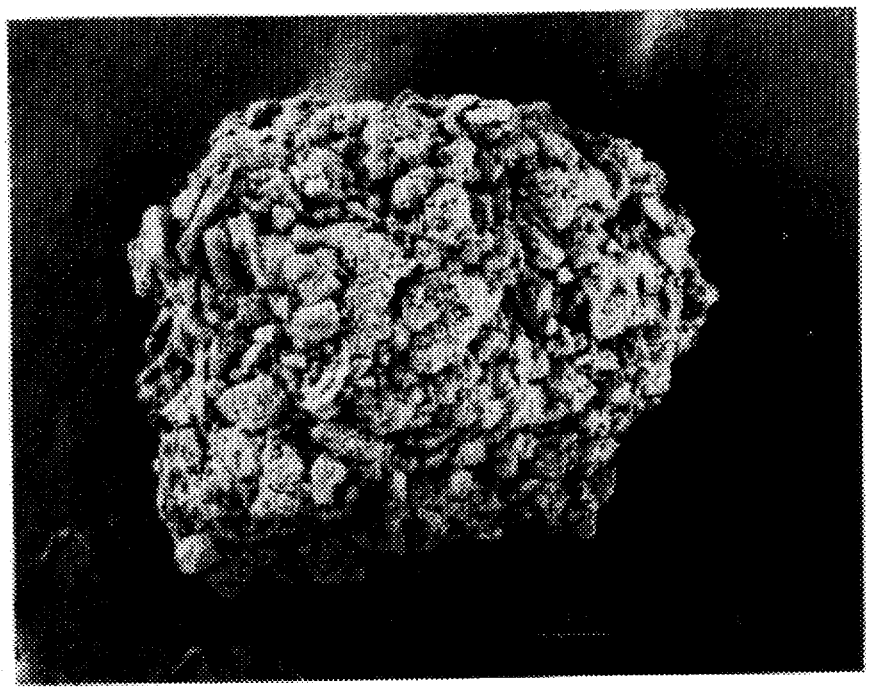
FIG. 4 is an electron micrograph (100 magnifications) of the surface of a pellet obtained by the method of high speed agitating granulation according to this invention.
Figure 5:
FIG. 5 is an electron micrograph (1000 magnifications) of the surface of a pellet obtained by the conventional method of high speed agitated granulation.
Figure 6:
FIG. 6 is an electron micrograph (1000 magnifications) of the surface of a pellet obtained by the conventional method of fluidized-bed granulation.
Figure 7:
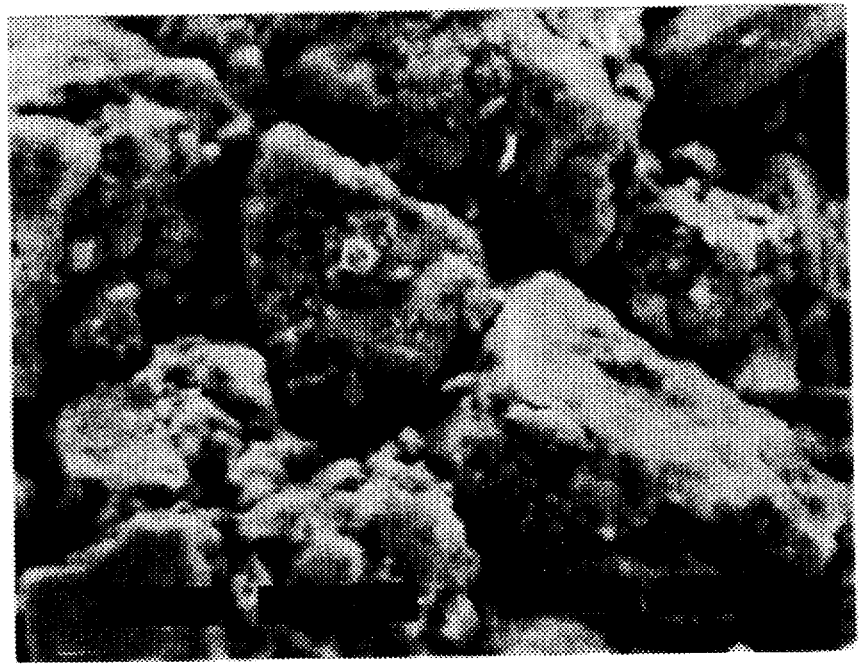
FIG. 7 is an electron micrograph (1000 magnifications) of the surface of a pellet obtained by the method of high speed agitated granulation according to this invention.
Figure 8:
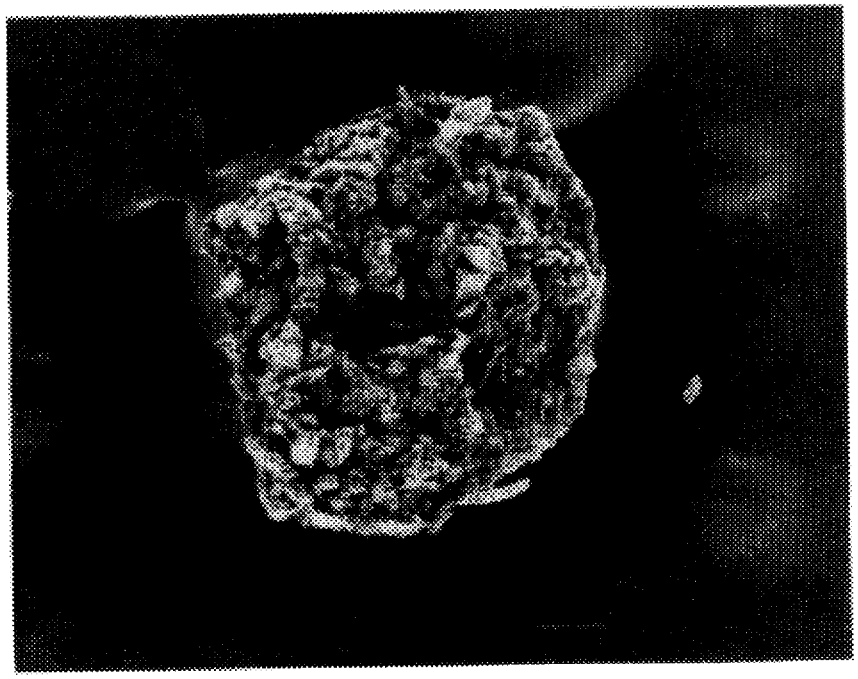
FIG. 8 is an electron micrograph (100 magnifications) of the cross section of a pellet obtained by the conventional method of high speed agitated granulation.
Figure 9:
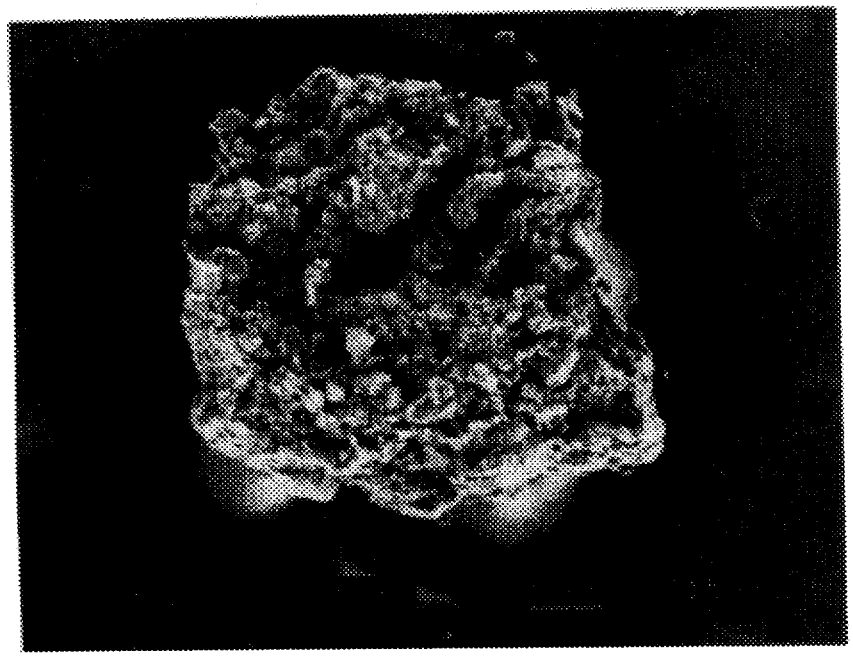
FIG. 9 is an electron micrograph (100 magnifications) of the cross section of a pellet obtained by the conventional method of fluidized-bed granulation.
Figure 10:
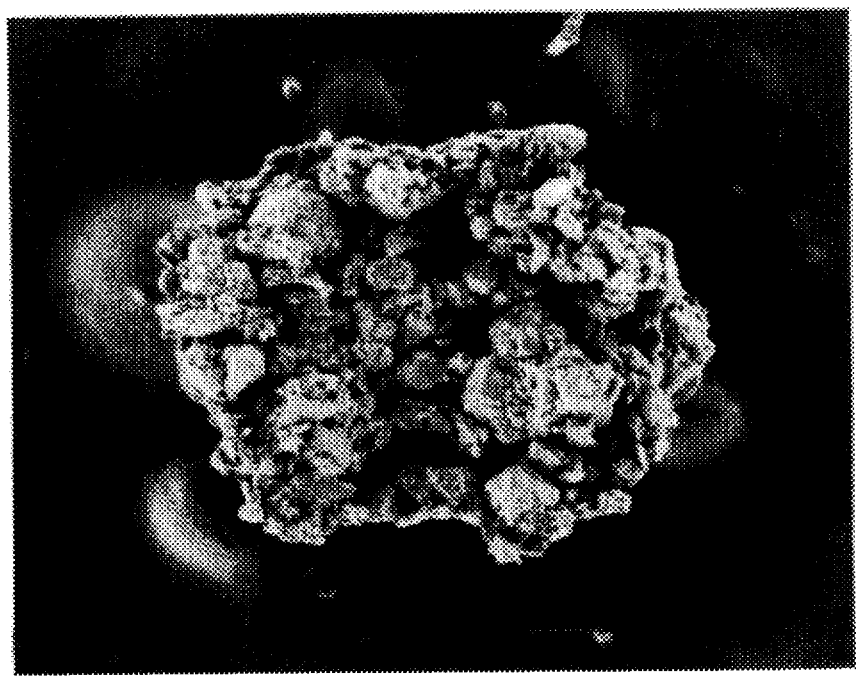
FIG. 10 is an electron micrograph (100 magnifications) of the cross section of a pellet obtained by the method of high speed agitated granulation according to this invention.

FIG. 1 is a conceptual diagram of one example of the high speed agitated granulating machine of this invention. The high speed agitated granulating machine of this invention is provided with a agitating vessel 1 of the shape of a truncated cone for accommodating a substance subjected to granulation, agitating blades 2 serving as agitating means, a spray gun 3 as spray means, disintegrating blades 4 as disintegrating means, a jacket 5 as drying means, a compressor 6, a vacuum pump 7, and automatic control means 8. The agitating blades 2, for example, are a set of three blades spaced by a prescribed angular interval and are disposed at the center of the inner bottom surface of the agitating vessel 1 and adapted to be rotated about a vertical axis by a motor 9 for agitating blades. The spray gun 3 is disposed in the upper part of the interior of the agitating vessel 1 and connected to a liquid storage tank 11 via a roller pump 10 with a liquid pipe. The disintegrating blades 4 are formed of a plurality of cruciform blades disposed coaxially and as spaced apart, disposed on the lateral part inside the agitating vessel 1, and rotated about a horizontal axis by a motor 12 for the disintegrating blades. The jacket 5 is wrapped around the periphery of the agitating vessel 1 and connected to a temperature regulator 13 with a water pipe. The compressor 6 is connected to the agitating vessel 1 with an air feed pipe. The vacuum pump 7 is connected to the agitating vessel 1 via a bag filter 14 with an air discharge pipe. The automatic control means 8 is a relay type automatic control device using contactors for the control and connected severally to the motor 9 for agitating blades, the motor 12 for disintegrating blades, the roller pump 10, the temperature regulator 13, the compressor 6, and the vacuum pump 7.

The method for high speed agitated granulation by the use of the apparatus of this example will be described below. First, by the rotation which is imparted by the motor 9 for agitating blades to the agitating blades 2, the substance for granulation stored in the agitating vessel 1 is circulated in a spiral stream and, as a result, rolled and stirred. The binding liquid which is supplied from the liquid storage tank 11 by the roller pump 10 is sprayed by the spray gun 3 onto the substance in the process of being pelletized in the agitating vessel 1. As a result, the substance undergoes granulation. The rotation which is imparted by the motor 12 for disintegrating blades to the disintegrating blades 4 exerts strong shearing forces locally on the granules in the process of formation in the agitating vessel 1 to disintegrate and uniformize the granules in process of formation. The temperature regulator 13 circulates hot water at a prescribed temperature through the jacket 5 to dry the granules in process of formation in the agitating vessel. When necessary at this time for exalting the efficiency of drying or effecting expulsion of the solvent, the compressor 6 is operated so as to ventilate the interior of the agitating vessel 1 through the medium of slits formed in the circumference of the rotary shaft for the agitating blades 2 and the disintegrating blades 4 inside the agitating vessel 1 or the vacuum pump 7 is operated so as to reduce the pressure in the interior of the agitating vessel 1.

In order that the agitating blades 2, the spray gun 3, the disintegrating blades 4, and the jacket 5 and optionally the compressor 6 or the vacuum pump 7 as well may be simultaneously operated at such steps in the process of production as mentioned above (so that all these parts may be continuously operated or part or all of them may be intermittently operated), the automatic control means 8 fulfills the function of controlling the operations of the agitating blades 9, the roller pump 10, the disintegrating blades 20, the temperature regulator 13, and the compressor 6 or the vacuum pump 7.

Example 2

Colored tablets having riboflavin butyrate as an active component thereof were produced by the conventional methods of high speed agitated granulation and fluidized-bed granulation and by the method for high speed agitated granulation according to this invention. The produced tablets were tested for various properties and the properties thus determined were compared.

The powders prepared and the tablets produced herein were tested for various physical properties by the following methods.

Size distribution

This attribute was tested by the procedure specified for the test of a granular agent for size distribution in the General Rules on Manufacture of Medicines, 12th Revised Edition of the Japanese Pharmacopoeia.

Rough specific volume angle of repose

A sample was tested for rough specific volume and angle of repose by the use of a powder tester (produced by Hosokawa Micron K. K.).

Weight

Sample tablets were each weighed by the use of an electronic balance (produced by Metler Corp. and marketed under product code of AE240"). The number of repetitions was 20. From the results of weighing, the average value (x), standard deviation (σ), and coefficient of variables (CV) were calculated.

Tensile strength

A sample was tested for hardness by the use of a tablet breaking strength tester (produced by Toyama Sangyo K. K. and marketed under product code of "TH203RP"). The relation between tensile strength and hardness is expressed by the following formula.

$$\tau = 2P/\pi DT \ (kg/cm^2)$$

(wherein τ stands for tensile strength, P for hardness, D for diameter of tablet, and T for thickness of tablet). The number of repetitions was 10. From the results, the average value (x) was calculated.

Disintegrating time

This attribute was tested by the procedure specified in the paragraph concerning tablets in the Method for General Test, 12th Revised Edition of the Japanese Pharmacopoeia. The number of repetitions was 6. From the results, the average value (x) was calculated.

Color tone

A sample tablet was tested for color tone by the use of a colorimeter (produced by Suga Shikenki K. K. and marketed under product code of "SM6"). The number of repetitions was 20. From the results, the average value (x) and the standard deviation (σ) were calculated.

Content

One sample tablet or classified sample granules were ground in a mortar. About 180 mg of each sample was weighed accurately, extracted from methanol, and then filtered. The filtrate was assayed at a wavelength of 445 nm by the use of a spectrophoto-meter (produced by Shimadzu Seisakusho Ltd. and marketed under product code of "UV160A"). From the results, the content, Xi (%), of riboflavin butyrate in the tablet or granules was calculated. The number of repetitions was 10 for tablets and 3 for granules. From the results, the average value (x̄), standard deviation (σ), and coefficient of variables (CV) were calculated. For the granules, the found values of these factors were averaged.

The riboflavin butyrate used herein was a medicine grade oil-soluble riboflavin derivative which consisted of yellow orange crystals or crystalline particles hardly soluble in water and easily soluble in ethanol. In the high speed agitated granulating machine of Example 1, 5 kg of a substance prepared for granulation by combining 10 parts by weight of the riboflavin butyrate with 79 parts by weight of milk sugar and 8 parts by weight of hydroxypropyl cellulose of a low substitution degree was homogenized and sprayed with 3 parts by weight as solids of an aqueous solution of 5% by weight of hydroxypropyl cellulose (HPC), with the jacket kept heated meanwhile. During the course of the granulation, the jacket was supplied with a stream of hot water at 80° C. and the interior of the agitating vessel was kept to a vacuum degree of 30 cm Hg. After the spraying was completed, the rotating speeds of the agitating blades and disintegrating blades were lowered and the interior of the agitating vessel was dried by heating under a reduced pressure so as to adjust the water content of the substance to 3% by weight.

In the experiments of the conventional methods, the substance of the same composition as mentioned above was used in the same amount as in the working example of this invention and pelletized by the standard procedure using an aqueous solution of the same binding agent (HPC) to obtain granules. During the granulation by the method of high speed agitated granulation, however, the substance for granulation was sprayed with the binding liquid over a long period of time (45 minutes) for the purpose of homogenizing the components of granules instead of the standard dropwise addition method resorting to instantaneous addition of the binding liquid. After the granulation was completed, the substance in the agitating vessel was dried by being heated under a reduced pressure.

Flat angular tablets weighing 188 mg apiece were produced by mixing 99.5 parts by weight of the granules obtained by the method mentioned above with 0.5 part by weight of magnesium stearate and press molding the resultant mixture under a fixed pressure.

The size distribution, rough specific volume, and angle of repose of the granules obtained herein are shown in Table 1 and the weight, tensile strength, decay time, color tone, and appearance by observation of the tablets are shown in Table 2.

TABLE 1

| | This invention | Conventional method | |
|---|---|---|---|
| | | High speed agitating granulation | Fluidized-bed granulation |
| Size distribution (% by wt) | | | |
| Less than 105μ | 34.2 | 51.7 | 16.0 |
| 105–177μ | 53.7 | 25.4 | 23.8 |
| 177–500μ | 11.6 | 22.4 | 55.6 |
| Over 500μ | 0.5 | 0.5 | 4.6 |

TABLE 1-continued

| | This invention | Conventional method | |
|---|---|---|---|
| | | High speed agitating granulation | Fluidized-bed granulation |
| Rough specific volume (cc/g) | 1.67 | 1.43 | 2.33 |
| Angle of repose (°) | 36.0 | 36.0 | 39.0 |

TABLE 2

| | This invention | Conventional method | |
|---|---|---|---|
| | | High speed agitating granulation | Fluidized-bed pelletization |
| Weight | | | |
| x̄ (mg) | 188.7 | 190.8 | 189.6 |
| σ (%) | 0.5 | 2.0 | 1.4 |
| CV (%) | 0.3 | 1.0 | 0.7 |
| Tensile strength (kg/cm²) | 52.7 | 39.5 | 41.2 |
| Decay time (min) | 8.3 | 7.8 | 8.8 |
| Color tone | | | |
| L value | | | |
| x̄ | 74.1 | 74.1 | 73.9 |
| σ | 0.06 | 0.31 | 0.21 |
| a value | | | |
| x̄ | 26.6 | 26.8 | 26.3 |
| σ | 0.08 | 0.48 | 0.24 |
| b value | | | |
| x̄ | 46.1 | 43.3 | 45.5 |
| σ | 0.05 | 0.34 | 0.15 |
| Appearance observed | Uniform color tone | Dark-light color on surface of tablet | slightly uneven color on surface of tablet |

It is clearly noted from Tables 1 and 2 that the granules obtained in accordance with this invention excelled those obtained by the conventional methods in flowability, packability in cavities, and compression moldability and the tables produced with the granules showed only small variation in weight, showed outstanding mechanical strength without entailing extension of decay time, and enjoyed very high homogeneity in color tone.

The contents of active components in the granules obtained in accordance with this invention and the contents thereof in the tablets are shown in Table 3.

TABLE 3

| | This invention | Conventional method | |
|---|---|---|---|
| | | High speed agitating granulation | Fluidized-bed pelletization |
| Granules | | | |
| Less than 75μ (%) | 101.6 | 87.9 | 91.8 |
| Over 177μ (%) | 100.2 | 136.1 | 112.0 |

TABLE 3-continued

|  | This invention | Conventional method | |
|---|---|---|---|
|  |  | High speed agitating granulation | Fluidized-bed pellet-ization |
| Tablets |  |  |  |
| x (%) | 100.6 | 102.0 | 101.2 |
| σ (%) | 1.2 | 2.6 | 2.1 |
| CV (%) | 1.2 | 2.5 | 2.1 |

It is noted from Table 3 that the granules obtained in accordance with this invention entailed no segregation of active components in terms of particle diameter.

The photographs of the front views and the cross sections of granules obtained with a scanning electron microscope (produced by Topcon K. K.) are shown in FIGS. 2–10. The granules obtained by the conventional methods were found to have resulted from mere aggregation of primary particles into minute particles. In clear contrast thereto, the granules obtained in accordance with this invention were found to be aggregates which had as their units such minute particles as hardly retained the original shape of primary particles. The bias in favor of this invention may be explained logically by a supposition that this invention produced the granules by amply repeating union and disunion of particles.

Example 3

Colored tablets having triamterene as an active component were produced by the method for high speed agitated granulation according to this invention.

Triamterene was a medicine of yellow crystalline particles sparingly soluble in water or ethanol. In the high speed agitated granulating machine of Example 1, 5 kg of a substance prepared for granulation by combining 30 parts by weight of triamterene with 60 parts by weight of milk sugar and 5 parts by weight of calcium carboxymethyl cellulose was homogenized and sprayed with 5 parts by weight as solids of a solution of 10% by weight of polyvinyl pyrrolidone using an aqueous solution containing 15% by weight of ethanol as a solvent. The size distribution of the granules consequently obtained is shown in Table 4. The rough specific volume of the granules was 1.58 cc/g.

TABLE 4

| Less than 105μ | 105μ–500μ | Over 500μ |
|---|---|---|
| 33.2 (wt %) | 59.5 (wt %) | 7.3 (wt %) |

Angular flat tablets weighing 180 mg apiece were produced by mixing 99.5% by weight of the granules consequently obtained with 0.5% by weight of magnesium stearate and compression molding the resultant mixture. The tablets showed extremely high homogeneity in color tone and amply high mechanical strength (tensile strength 50.4 kg/cm$^2$).

Industrial Applicability

The method for high speed agitated granulation according to this invention is capable of producing granules which are very highly homogeneous in contents of components and excellent in flowability and compression moldability. The granules in process of formation do not easily form coarse lumps as by cohesion and the produced granules possess stable quality. The tablets which are produced with the granules obtained by the method of this invention are extremely homogeneous in terms of contents of active components, color tone, etc. and enjoy outstanding mechanical strength.

We claim:

1. A method for the production of granules by the use of a high speed agitated granulating machine provided with agitating means for rolling and agitating a substance for granulation, spray means for spraying a binding liquid on said substance, disintegrating means for disintegrating particles arising from granulation, and drying means for drying said particles, characterized by effecting said production by causing said agitating means, said spray means, said disintegrating means and said drying means to act on said substance for granulation simultaneously thereby performing the operations of agitating, granulating, disintegrating, and drying simultaneously.

2. A method according to claim 1, wherein part or all of said agitating means, said spray means, said disintegrating means and said drying means are intermittently operated.

3. A high speed agitated granulating machine, comprising:

agitating means for rolling and agitating a substance for granulation;

spray means for spraying a binding liquid on said substance;

disintegrating means for disintegrating particles arising from granulation;

drying means for drying said particles; and automatic control means for simultaneously operating said agitating means, said spray means, said disintegrating means and said drying means and simultaneously performing the agitating, granulating, disintegrating, and drying operations.

4. A method for the production of granules, comprising the steps of:

providing a high speed agitated granulating machine including an agitating vessel;

disposing the substance to be granulated into the vessel;

rolling and agitating the substance for granulating the substance, substantially without fluidizing and substantially without suspending the substance, with an agitating means;

spraying a binding liquid on the substance with spray means;

disintegrating particles arising from granulation with disintegrating means; drying said particles with drying means; and causing said agitating means, said spray means, said disintegrating means and said drying means to act on the substance simultaneously thereby performing the steps of agitating, granulating, disintegrating, and drying simultaneously.

* * * * *